(12) United States Patent
Suzuki et al.

(10) Patent No.: US 8,911,125 B2
(45) Date of Patent: Dec. 16, 2014

(54) CIRCUIT MODULE, LIGHT EMITTING MODULE, AND AUTOMOTIVE LAMP

(71) Applicant: Koito Manufacturing Co., Ltd., Tokyo (JP)

(72) Inventors: Tetsuya Suzuki, Shizuoka (JP); Akihiro Matsumoto, Shizuoka (JP); Takashi Inoue, Shizuoka (JP); Tomoyuki Nakagawa, Shizuoka (JP); Naoki Sone, Shizuoka (JP)

(73) Assignee: Koito Manufacturing Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 13/837,670

(22) Filed: Mar. 15, 2013

(65) Prior Publication Data

US 2013/0201706 A1    Aug. 8, 2013

Related U.S. Application Data

(63) Continuation of application No. PCT/JP2011/005054, filed on Sep. 8, 2011.

(30) Foreign Application Priority Data

Sep. 28, 2010    (JP) .................. 2010-217566

(51) Int. Cl.
  *F21V 29/00*    (2006.01)
  *F21S 8/10*     (2006.01)
  *F21V 29/02*    (2006.01)
  *F21V 23/02*    (2006.01)
  *F21Y 101/02*   (2006.01)

(52) U.S. Cl.
  CPC .............. *F21V 29/22* (2013.01); *F21V 29/02* (2013.01); *F21S 48/1159* (2013.01); *F21S 48/00* (2013.01); *F21V 23/02* (2013.01); *F21Y 2101/02* (2013.01); *F21S 48/325* (2013.01); *F21V 29/027* (2013.01); *F21S 48/321* (2013.01); *F21S 48/1109* (2013.01)
  USPC ................. 362/487; 362/249.01; 362/382

(58) Field of Classification Search
  CPC .............. H01L 2224/48472; H01L 33/486; F21V 29/004; F21Y 2101/02
  USPC ........................................ 362/487
  See application file for complete search history.

(56) References Cited

U.S. PATENT DOCUMENTS 7,218,041 B2  5/2007  Isoda
7,237,935 B2  7/2007  Ito et al.
(Continued)

FOREIGN PATENT DOCUMENTS

| CN | 1460811 A | 12/2003 |
|---|---|---|
| JP | 2005063754 A | 3/2005 |
| JP | 2007-305455 A | 11/2007 |
| JP | 2010-135076 A | 6/2010 |
| JP | 2010198847 A | 9/2010 |

OTHER PUBLICATIONS

Osawa, Japanese Patent Application Publication 2005-063754, Mar. 2005, machine translation.*

(Continued)

*Primary Examiner* — Tracie Y Green
(74) *Attorney, Agent, or Firm* — Buchanan Ingersoll & Rooney PC (57) ABSTRACT

A circuit module includes: a lighting control circuit that controls lighting of a semiconductor light emitting element; a first heat radiating member on which the lighting control circuit is mounted; a second heat radiating member that is separated from the first heat radiating member and has a surface on which the semiconductor light emitting element is mounted; and a connecting mechanism having both a housing that connects the first heat radiating member and the second heat radiating member together and a conductive portion that transmits a signal from the lighting control circuit to the semiconductor light emitting element. The housing is formed of a material having a coefficient of thermal conductivity lower than those of the first heat radiating member and the second heat radiating member.

4 Claims, 5 Drawing Sheets

(56) References Cited

U.S. PATENT DOCUMENTS

| | | | |
|---|---|---|---|
| 2005/0201115 A1 | 9/2005 | Ito et al. | |
| 2010/0128463 A1* | 5/2010 | Kim et al. | 362/84 |
| 2010/0135037 A1 | 6/2010 | Tsukamoto | |
| 2010/0253223 A1* | 10/2010 | Inoue et al. | 315/82 |
| 2010/0315830 A1* | 12/2010 | Wan et al. | 362/547 |
| 2013/0201707 A1* | 8/2013 | Suzuki et al. | 362/487 |

OTHER PUBLICATIONS

JPO, International Preliminary Report on Patentability in counterpart application PCT/JP2011/005054 dated Apr. 16, 2003.

JPO, International Search Report in counterpart application PCT/JP2011/005054 dated Dec. 13, 2011.

Korean Notification of Reason(s) for Refusal dated Mar. 28, 2014 issued in the corresponding Korean Patent Application No. 10-2013-7008947 and English language translation.

Japanese Notification of Reason(s) for Refusal dated Apr. 22, 2014 issued in the corresponding Japanese Patent Application No. 2010-217566 and English language translation (6 pages).

Chinese First Office Action dated Jul. 21, 2014 issued in the corresponding Chinese Patent Application No. 201180045641.3 and English language translation (16 pages).

Korean Notification of Reason(s) for Refusal dated Aug. 14, 2014 issued in the corresponding Korean Patent Application No. 10-2013-7008947 and English language translation (7 pages).

* cited by examiner

CIRCUIT MODULE, LIGHT EMITTING MODULE, AND AUTOMOTIVE LAMP

CROSS-REFERENCE TO RELATED APPLICATIONS

This application is based upon and claims the benefit of priority from the prior Japanese Patent Application No. 2010-217566, filed on Sep. 28, 2010, and International Patent Application No. PCT/JP 2011/005054, filed on Sep. 8, 2011, the entire content of each of which is incorporated herein by reference.

BACKGROUND OF THE INVENTION

1. Field of the Invention

The present invention relates to a circuit module, a light emitting module, and an automotive lamp.

2. Description of the Related Art

Until now, a technique is being developed, in which a semiconductor light emitting element, such as an LED (Light Emitting Diode), is used in an automotive lamp as a light source. In such an automotive lamp, a lighting circuit for controlling lighting of the semiconductor light emitting element may be required. Because each of a semiconductor light emitting element and a lighting circuit generates heat while an automotive lamp is being lighted, a suitable heat radiation measure is required. Accordingly, in order to efficiently transmit heat to a heat radiating member, such as a heat sink, a light source module provided with a metal substrate having a high coefficient of thermal conductivity on which a semiconductor light emitting element and a lighting circuit are mounted together is devised (see Japanese Patent Application Publication No. 2005-259603).

With respect to a semiconductor light emitting element and a lighting control circuit, their calorific powers are different from each other and the temperatures at which they are allowed to work are also different from each other. However, when a semiconductor light emitting element and a lighting control circuit are mounted together on a single heat radiating member, it is needed to design the heat radiating member by taking into consideration an electronic component whose temperature, at which it is allowed to work, is set to be low. Accordingly, the heat radiating member thus designed will have an excessive performance for an electronic component whose temperature, at which it is allowed to work, is set to be high.

SUMMARY OF THE INVENTION

The present invention has been made in view of these situations, and a purpose of the invention is to provide a technique in which the heat radiation of each of a semiconductor light emitting element and a lighting control circuit can be individually optimized.

In order to solve the aforementioned problem, a circuit module according to an embodiment of the present invention comprises: a lighting control circuit configured to control lighting of a semiconductor light emitting element; a first heat radiating member on which the lighting control circuit is mounted; a second heat radiating member that is separated from the first heat radiating member and has a mounting surface on which the semiconductor light emitting element is mounted; and a connecting mechanism having both a connecting portion that connects the first heat radiating member and the second heat radiating member together and a conductive portion that transmits a signal from the lighting control circuit to the semiconductor light emitting element. The connecting portion is formed of a material having a coefficient of thermal conductivity lower than those of the first heat radiating member and the second heat radiating member.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

A circuit module according to an embodiment of the present invention comprises: a lighting control circuit configured to control lighting of a semiconductor light emitting element; a first heat radiating member on which the lighting control circuit is mounted; a second heat radiating member that is separated from the first heat radiating member and has a mounting surface on which the semiconductor light emitting element is mounted; and a connecting mechanism having both a connecting portion that connects the first heat radiating member and the second heat radiating member together and a conductive portion that transmits a signal from the lighting control circuit to the semiconductor light emitting element. The connecting portion is formed of a material having a coefficient of thermal conductivity lower than those of the first heat radiating member and the second heat radiating member.

According to this embodiment, because the first heat radiating member and the second heat radiating member are separated from each other and the connecting portion, by which they are connected together, is formed of a material having a low coefficient of thermal conductivity, the heat conduction between the first heat radiating member and the second heat radiating member can be suppressed. That is, it hardly occurs that the temperature of a lighting control circuit and that of a semiconductor light emitting element may approach each other due to the heat transfer through a heat radiating member. Accordingly, it becomes possible to work a lighting control circuit and a semiconductor light emitting element in different temperature ranges, thereby allowing the structure of each of a first heat radiating member and a second heat radiating member to be individually optimized in accordance with the temperature at which each of them is worked.

Another embodiment of the present invention is a light emitting module. This light emitting module comprises the circuit module and a semiconductor light emitting element mounted on the mounting surface of the second heat radiating member.

According to this embodiment, the first heat radiating member on which a lighting control circuit is mounted and the second heat radiating member on which the semiconductor light emitting element is mounted can be individually designed by taking into consideration the heat radiation property of each of the members, and hence the light emitting module can be miniaturized as a whole.

The highest temperature at which the lighting control circuit is allowed to work is set to be lower than that at which the semiconductor light emitting element is allowed to work, and the thermal resistance of the first heat radiating member is larger than that of the second heat radiating member.

Still another embodiment of the present invention is an automotive lamp. This automotive lamp is used in a vehicle and comprises: the light emitting module; and a reflector configured to reflect the light emitted from the light emitting module toward the vehicle front side. The light emitting module is arranged such that a light emitting surface of the semiconductor light emitting element faces the reflector.

According to this embodiment, the first heat radiating member on which the lighting control circuit is mounted and the second heat radiating member on which the semiconductor light emitting element is mounted can be individually designed by taking into consideration the heat radiation property of each of the members, and hence the automotive lamp can be miniaturized.

The automotive lamp may further comprise a cooling fan. The cooling fan may be arranged such that air can be blown onto both the first heat radiating member and the second heat radiating member. Thereby, the first heat radiating member and the second heat radiating member can be further miniaturized while desired heat radiation performances thereof are being met, and the automotive lamp can also be miniaturized.

Optional combinations of the aforementioned constituting elements and implementations of the present invention in the form of methods, apparatuses, or systems may also be practiced as additional modes of the invention.

ADVANTAGE OF THE INVENTION

According to the present invention, the heat radiation of each of a semiconductor light emitting element and a lighting control circuit can be individually optimized.

Hereinafter, preferred embodiments for carrying out the present invention will be described in detail with reference to the accompanying drawings. In the description of the drawings, like elements will be denoted with like reference numerals and duplicative description will be appropriately omitted.

First Embodiment

In First Embodiment, an automotive headlamp, which is one of automotive lamps, will be described as an example.

Figure 1:
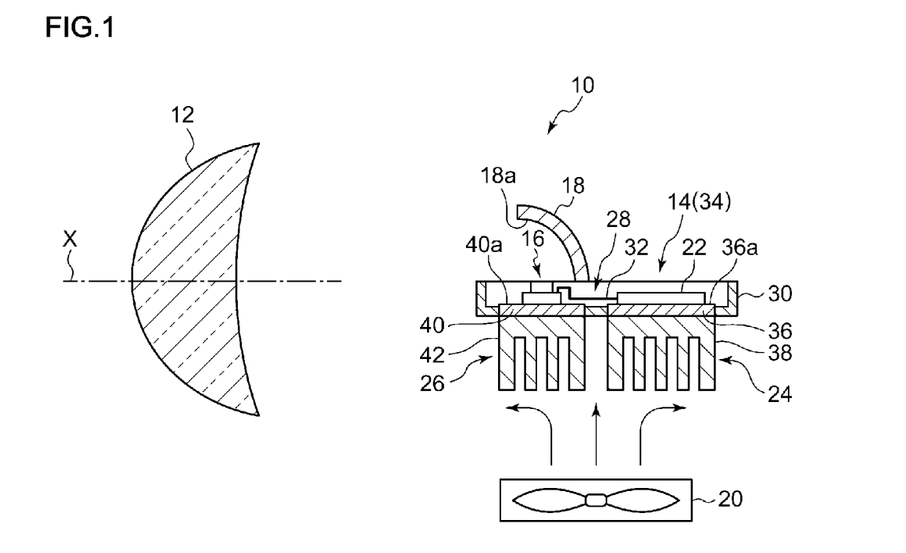
FIG. 1 is a sectional view illustrating the schematic structure of an automotive headlamp according to First Embodiment.

FIG. 1 is a sectional view illustrating the schematic structure of an automotive headlamp 10 according to First Embodiment. The automotive headlamp 10 illustrated in FIG. 1 is structured such that the later-described projection lens is located on the vehicle front side and the later-described light emitting module is located on the vehicle rear side. Herein, the line X is an optical axis.

The automotive headlamp 10 comprises a projection lens 12, a circuit module 14, a package 16, a reflector 18, and a cooling fan 20. The projection lens 12 is an aspheric surface convex lens whose front side surface is formed to have a convex surface, and projects a light source image toward the front of the lamp as an inverted image. The package 16 includes a semiconductor light emitting element, such as an LED.

The circuit module 14 includes: a lighting control circuit 22 that controls lighting of the semiconductor light emitting element included in the package 16; a first heat radiating member 24 on which the lighting control circuit 22 is mounted; a second heat radiating member 26 on which the package 16 is mounted; and a connecting mechanism 28. The connecting mechanism 28 has both a housing 30 that connects and fixes the first heat radiating member 24 and the second heat radiating member 26 together and a conductive portion 32 that transmits a signal from the lighting control circuit 22 to the semiconductor light emitting element in the package 16.

The first heat radiating member 24 and the second heat radiating member 26 are both formed of materials each having a high coefficient of thermal conductivity. Metallic materials, such as aluminum and copper, are used as such materials. The housing 30 is formed of a material having a coefficient of thermal conductivity lower than those of the first heat radiating member and the second heat radiating member, such as a resin. Thereby, the first heat radiating member 24 and the second heat radiating member 26 are thermally separated from each other. Hereinafter, a module in which the package 16 is mounted on the circuit module 14 is referred to as a light emitting module 34.

The first heat radiating member 24 is formed by a first heat radiating plate 36 and a first heat sink 38. The first heat radiating plate 36 is fixed to the upper surface of the first heat sink 38. The second heat radiating member 26 is formed by a second heat radiating plate 40 and a second heat sink 42. The second heat radiating plate 40 is fixed to the upper surface of the second heat sink 42.

A surface 36a of the first heat radiating plate 36 functions as a mounting surface on which the lighting control circuit 22 is mounted. A surface 40a of the second heat radiating plate 40 functions as a mounting surface on which the semiconductor light emitting element included in the package 16 is mounted. Herein, each of the heat radiating members is formed by a heat radiating plate and a heat sink, but may be formed by one of the two members.

The first heat radiating member 24 suppresses an increase in the temperature of the lighting control circuit 22 by recovering the heat emitted by the lighting control circuit 22 through the first heat radiating plate 36 and then by radiating the heat. The second heat radiating member 26 suppresses an increase in the temperature of the package 16 by recovering the heat emitted by the package 16 through the second heat radiating plate 40 and then by radiating the heat.

The reflector 18 is provided so as to cover the package 16 from above, and in the inside of the reflector 18, a reflecting surface 18a that collects the light emitted from the package 16 by reflecting the light forward. That is, the light emitting module 34 is arranged such that the surface 40a, which is a mounting surface of the second heat radiating plate 40, faces the reflector 18. Thereby, the reflector 18 collects the light emitted from the package 16 by reflecting the light on the reflecting surface 18a.

In the case of a conventional light emitting module in which a semiconductor light emitting element and a lighting control circuit are mounted on a single heat radiating member, the temperatures of the semiconductor light emitting element and the lighting control circuit are almost the same as each other when a thermal equilibrium condition is achieved due to the heat transfer through the heat radiating member during continuous work. Accordingly, it has been required to determine the performance of the single heat radiating member by taking, of the semiconductor light emitting element and the lighting control circuit, one of the two members having a lower temperature at which it is allowed to work into consideration.

In the circuit module 14 and the light emitting module 34 according to the present embodiment, however, the housing 30 that connects the first heat radiating member 24 and the second heat radiating member 26 together is formed of a resin material having a low coefficient of thermal conductivity, as stated above, and hence the first heat radiating member 24 and the second heat radiating member 26 are thermally separated from each other. Accordingly, the heat conduction between the first heat radiating member 24 and the second heat radiating member 26 is suppressed. That is, it is suppressed that the temperatures of a lighting control circuit and a semiconductor light emitting element may approach each other due to the heat transfer through a heat radiating member. Accordingly, it becomes possible to work the lighting control circuit 22 and the semiconductor light emitting element in temperature ranges different from each other; and the structures of the first heat radiating member 24 and the second heat radiating member 26 can be individually optimized in accordance with the temperature range in which each of the two members is worked.

In addition, in the light emitting module 34 according to the present embodiment, the highest temperature (e.g., 125° C.) at which the lighting control circuit 22 is allowed to work is set to be lower than the highest temperature (e.g., 150° C.) at which the semiconductor light emitting element (package 16) is allowed to work. In addition, the calorific power of the lighting control circuit 22 according to the embodiment is smaller than that of the semiconductor light emitting element in the package 16. Therefore, when the calorific power of the lighting control circuit 22 is small, a heat radiating member having a large thermal resistance (having a small heat radiation performance) can be adopted as the first heat radiating member 24. In general, a heat radiating member having a low heat radiation performance can be miniaturized and cost can be reduced from viewpoints of shape and material. Accordingly, the thermal resistance of the first heat radiating member 24 according to the embodiment is set to be larger than that of the second heat radiating member 26.

As stated above, in the circuit module 14 and the light emitting module 34 according to the present embodiment, the first heat radiating member 24 and the second heat radiating member 26 can be individually designed by taking into consideration the heat radiation property of each of the members, and hence the circuit module 14 and the light emitting module 34 can be miniaturized as a whole. Further, the automotive headlamp 10 comprising such the circuit module 14 and the light emitting module 34 is also miniaturized.

The cooling fan 20 included in the automotive headlamp 10 according to the present embodiment is arranged such that air can be blown onto both the first heat radiating member 24 and the second heat radiating member 26. Thereby, the first heat radiating member 24 and the second heat radiating member 26 can be further miniaturized while desired heat radiation performances thereof are being met, and the automotive headlamp 10 can also be miniaturized. In addition, because the number of the cooling fans 20 can be reduced, the cost of the automotive headlamp 10 can also be reduced. Alternatively, the cooling fan 20 may be fixed to the heat sink.

Second Embodiment

Figure 2:
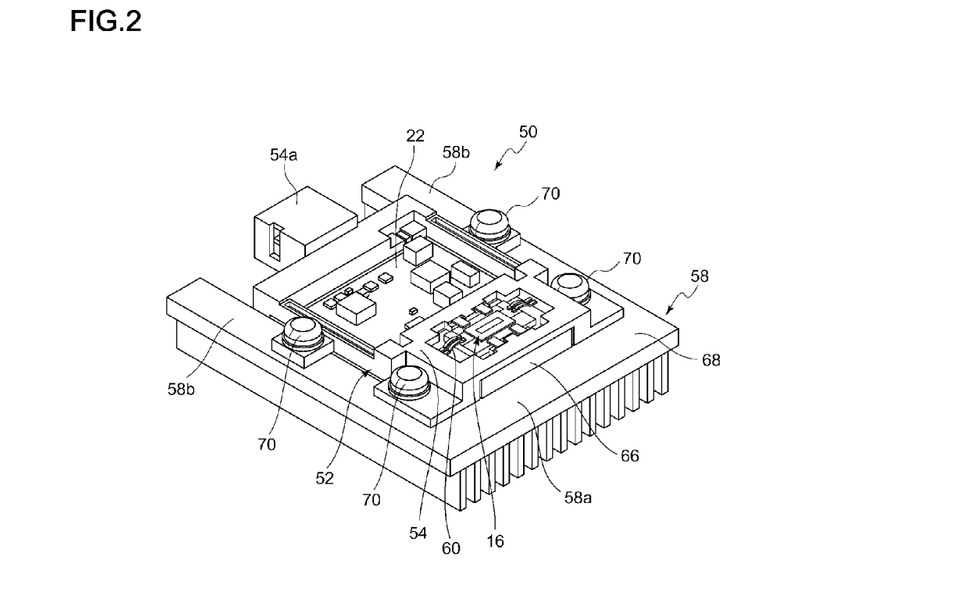
FIG. 2 is a perspective view illustrating the schematic structure of a light emitting module according to Second embodiment.
Figure 3:
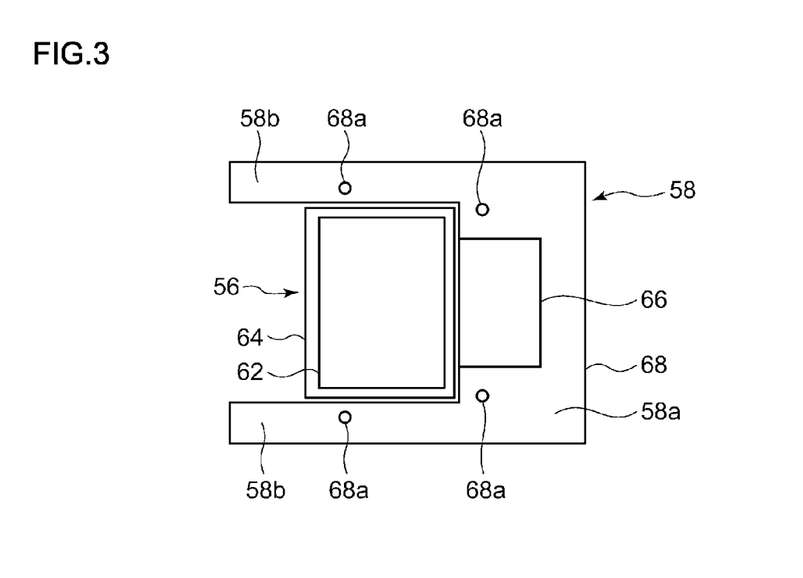
FIG. 3 is a top view illustrating, of the light emitting module according to Second Embodiment, mainly the structure of a heat radiating member.

FIG. 2 is a perspective view illustrating the schematic structure of a light emitting module according to Second Embodiment. FIG. 3 is a top view illustrating, of the light emitting module according to Second Embodiment, mainly the structure of a heat radiating member. Hereinafter, description of the structures and the operation effects similar to those in First Embodiment will be appropriately omitted.

As illustrated in FIG. 2, a light emitting module 50 comprises the package 16, the lighting control circuit 22, a first heat radiating member 56 (see FIG. 3), a second heat radiating member 58, and a connecting mechanism 52. As illustrated in FIGS. 2 and 3, the connecting mechanism 52 has both a housing 54 made of a resin that connects and fixes the first heat radiating member 56 and the second heat radiating member 58 together, and a conductive portion 60 that transmits a signal from the lighting control circuit 22 to a semiconductor light emitting element in the package 16.

The first heat radiating member 56 has a first heat radiating plate 62 on which the lighting control circuit 22 is mounted and a first heat sink 64 provided so as to be in contact with the lower surface of the first heat radiating plate 62. The second heat radiating member 58 has a second heat radiating plate 66 on which the package 16 is mounted and a second heat sink 68 provided so as to be in contact with the lower surface of the second heat radiating plate 66. Four screw holes 68a are provided in the surface of the second heat sink 68. The housing 54 is fixed to the second heat sink 68 with four screws 70 in a state where the first heat radiating member 56 on which the lighting control circuit 22 is mounted is being held. A connector portion 54a, to which the power supplied from an external power source is inputted, is integrally molded at an end portion of the housing 54. Alternatively, FPC (Flexible Printed Circuits) may be connected thereto instead of the connector portion 54a.

The second heat radiating member 58 is formed to be square U-shaped, and has a base portion 58a provided with the second heat radiating plate 66 and a pair of arm portions 58b extending from both sides of the base portion 58a to the same direction. The pair of arm portions 58b are extended from both ends of the base portion 58a so as to face each other and to be almost parallel to each other. In addition, the pair of the arm portions 58b are arranged so as to sandwich the first heat radiating member 56 having a rectangular shape. The pair of arm portions 58b of the second heat radiating member 58 and the housing 54 are fixed to each other with the screws 70.

Alternatively, the housing 54 and each of the heat radiating members may be fixed to each other with an adhesive. In addition, a brush, Au wire, Al wire, Ai ribbon, or the like may be used in the conductive portion 60. It is preferable that the second heat radiating plate 66 is formed of a material having a high heat radiation property, such as Al, Cu, Cu alloy, or the like. Each of the heat radiating members according to the present embodiment is integrated by adhering or metal-bonding a heat radiating plate and a heat sink that have been produced separately from each other; however, it may be integrally molded by aluminum die casting process.

Also, in the light emitting module 50 according to the present embodiment, the first heat radiating member 56 and the second heat radiating member 58 are thermally separated from each other, and the housing 30 that connects the two members together is formed of a resin material having a low coefficient of thermal conductivity. Accordingly, the heat conduction between the first heat radiating member 56 and the second heat radiating member 58 can be suppressed.

Third Embodiment

Figure 4:
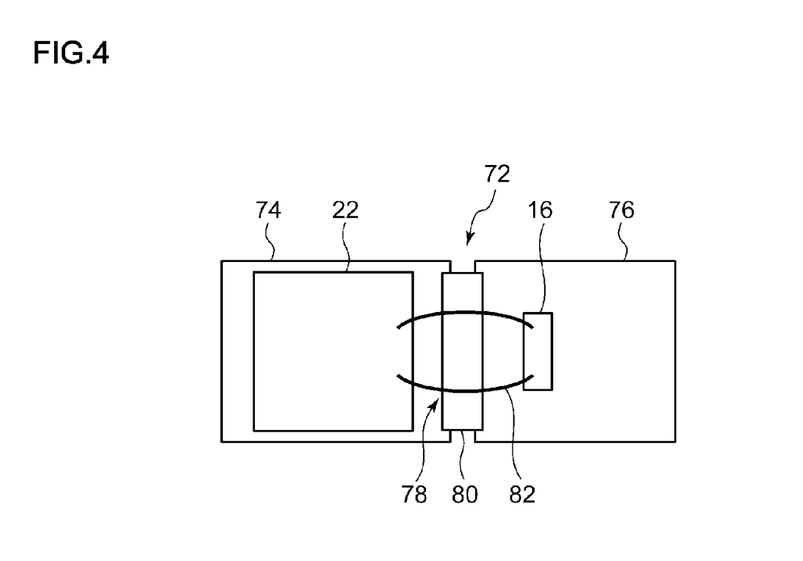
FIG. 4 is a top view illustrating the schematic structure of a light emitting module according to Third Embodiment.

FIG. 4 is a top view illustrating the schematic structure of alight emitting module according to Third Embodiment. Hereinafter, description of the structures and the operation effects similar to those in each of the aforementioned embodiments will be appropriately omitted.

As illustrated in FIG. 4, a light emitting module 72 comprises the package 16, the lighting control circuit 22, a first heat radiating member 74, a second heat radiating member 76, and a connecting mechanism 78. The connecting mechanism 78 is formed by: a connecting portion 80 that connects the first heat radiating member 74 and the second heat radiating member 76 and is made of a resin material; and a metal wire 82 that transmits a signal from the lighting control circuit 22 to the semiconductor light emitting element in the package 16. Al, Au, or the like is used as the material of the metal wire 82. Alternatively, FPC may be used instead of the metal wire 82.

Also, in the light emitting module 72 according to the present embodiment, the first heat radiating member 74 and the second heat radiating member 76 are thermally separated from each other and the connecting portion 80 that connects the two members together is formed of a resin material having a low coefficient of thermal conductivity, as stated above. Accordingly, the heat conduction between the first heat radiating member 74 and the second heat radiating member 76 can be suppressed.

Fourth Embodiment

Figure 5:
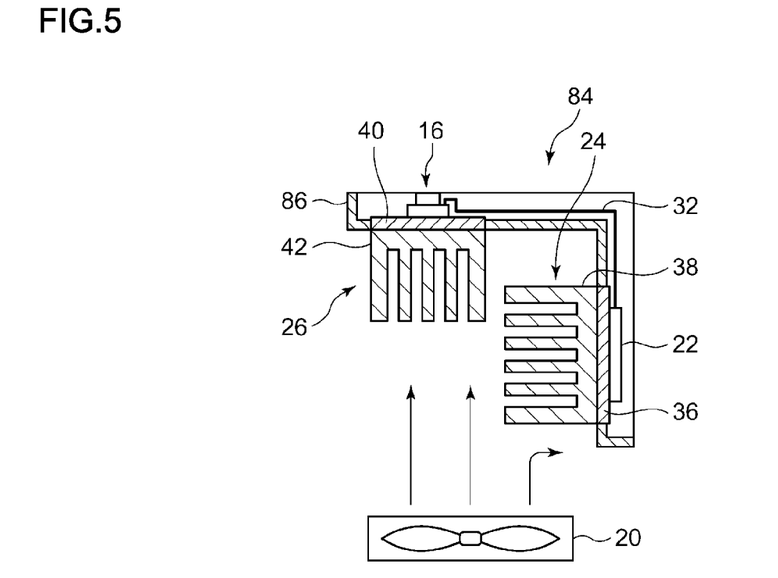
FIG. 5 is a sectional view illustrating the schematic structure of a light emitting module according to Fourth Embodiment.

FIG. 5 is a sectional view illustrating the schematic structure of a light emitting module according to Fourth Embodiment. Hereinafter, description of the structures and the operation effects similar to those in each of the aforementioned embodiments will be appropriately omitted.

A light emitting module 84 according to the present embodiment is the same as that in First Embodiment, including their components, except that the section of a housing 86 has an L-shape and the direction of the first heat radiating member 24 and that of the second heat radiating member 26 are different from each other. By applying such the light emitting module 84 to an automotive headlamp, the length in the optical axis direction of the automotive headlamp can be made small.

Fifth Embodiment

Figure 6:
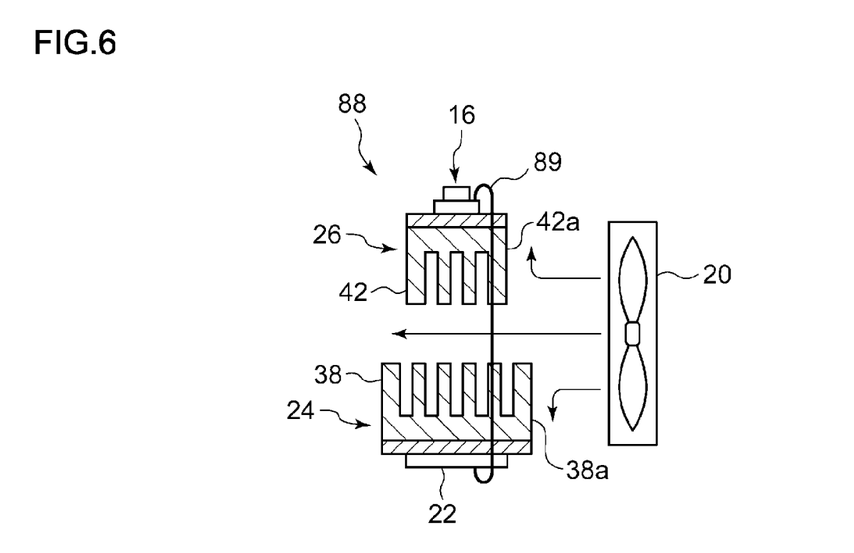
FIG. 6 is a sectional view illustrating the schematic structure of a light emitting module according to Fifth Embodiment.

FIG. 6 is a sectional view illustrating the schematic structure of a light emitting module according to Fifth Embodiment. Hereinafter, description of the structures and the operation effects similar to those in each of the aforementioned embodiments will be appropriately omitted.

In a light emitting module 88 according to the present embodiment, the first heat radiating member 24 and the second heat radiating member 26 are arranged such that the first heat sink 38 and the second heat sink 42 face each other. The first heat radiating member 24 and the second heat radiating member 26 are connected together by a housing made of a resin (not illustrated). A metal wire 89, which transmits a signal from the lighting control circuit 22 to the semiconductor light emitting element in the package 16, is provided in the light emitting module 88.

In the light emitting module 88, an air trunk is formed between the first heat radiating member 24 and the second heat radiating member 26. Part of the wind generated in the cooling fan 20 passes through the air trunk, while taking heat from the first heat sink 38 and the second heat sink 42. Also, part of the wind generated in the cooling fan 20 simultaneously cools the side surface 38a of the first heat sink 38 and the side surface 42a of the second heat sink 42. By applying such the light emitting module 88 to an automotive headlamp, the length in the optical axis direction of the automotive headlamp can be made small.

Sixth Embodiment

Figure 7:
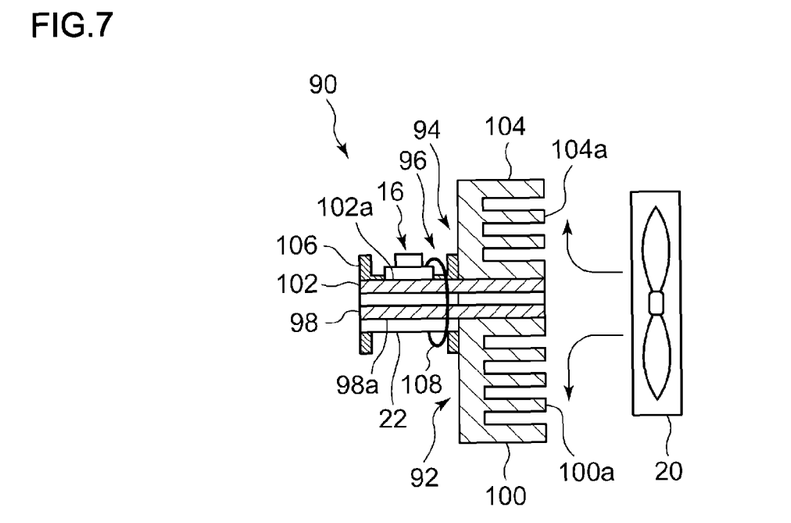
FIG. 7 is a sectional view illustrating the schematic structure of a light emitting module according to Sixth Embodiment.

FIG. 7 is a sectional view illustrating the schematic structure of a light emitting module according to Sixth Embodiment. Hereinafter, description of the structures and the operation effects similar to those in each of the aforementioned embodiments will be appropriately omitted.

A light emitting module 90 according to the present embodiment comprises the package 16, the lighting control circuit 22, a first heat radiating member 92 on which the lighting control circuit 22 is mounted, a second heat radiating member 94 on which the package 16 is mounted, and a connecting mechanism 96.

The first heat radiating member 92 has: a first heat radiating plate 98 on which the lighting control circuit 22 is mounted; and a first heat sink 100 fixed to amounting surface 98a of the first heat radiating plate 98 on which the lighting control circuit 22 is mounted. The first heat sink 100 is fixed to the first heat radiating plate 98 such that the longitudinal direction of a fin 100a is parallel to the mounting surface 98a.

The second heat radiating member 94 has: a second heat radiating plate 102 on which the package 16 is mounted; and a second heat sink 104 fixed to a mounting surface 102a of the second heat radiating plate 102 on which the package 16 is mounted. The second heat sink 104 is fixed to the second heat radiating plate 102 such that the longitudinal direction of a fin 104a is parallel to the mounting surface 102a.

The connecting mechanism 96 has both a housing 106 that connects and fixes the first heat radiating plate 98 and the second heat radiating plate 102 together and a metal wire 108 that transmits a signal from the lighting control circuit 22 to the semiconductor light emitting element in the package 16. The cooling fan 20 is provided at a position where the cooling fan 20 faces each of the fins of the first heat sink 100 and the second heat sink 104 in the light emitting module 90.

Because the wind generated in the cooling fan 20 blows equally onto each of the fins of the first heat sink 100 and the second heat sink 104, the wind can efficiently take heat from the first heat radiating member 92 and the second heat radiating member 94.

Subsequently, the case will be described, in which a lamp using a plurality of the light emitting module according to each of the aforementioned embodiments is cooled. FIGS. 8 to 11 are views each schematically illustrating a positional relationship between the plurality of the light emitting modules and a cooling fan. The plurality of the light emitting modules described below may be ones selected from the light emitting modules according to the aforementioned respective embodiments, or ones in which multiple types of the light emitting modules are combined.

Figure 8:
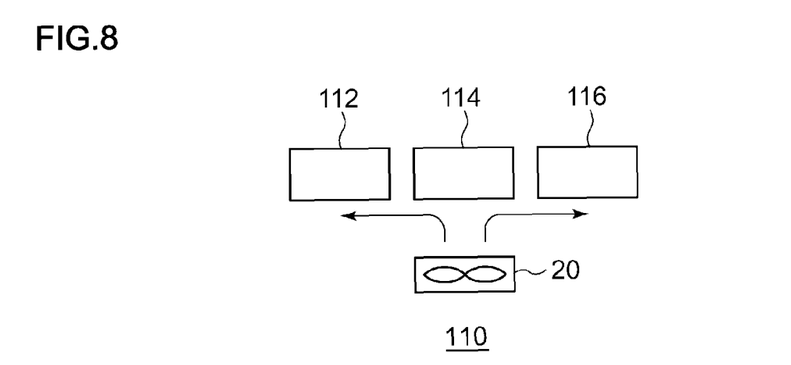
FIG. 8 is a view schematically illustrating a positional relationship between a plurality of light emitting modules and a cooling fan.

As illustrated in FIG. 8, a lamp 110 comprises three light emitting modules 112, 114, and 116 and the cooling fan 20. The three light emitting modules 112, 114, and 116 are linearly arranged, and the cooling fan 20 is arranged at a position where the fan 20 faces the middle light emitting module 114. Accordingly, the wind in the cooling fan 20 moves toward the light emitting module 114 and then moves toward the adjacent light emitting modules 112 and 116 by being blocked with the light emitting module 114. Thereby, the plurality of the light emitting modules 112, 114, and 116 can be efficiently cooled by the single cooling fan 20.

Figure 9:
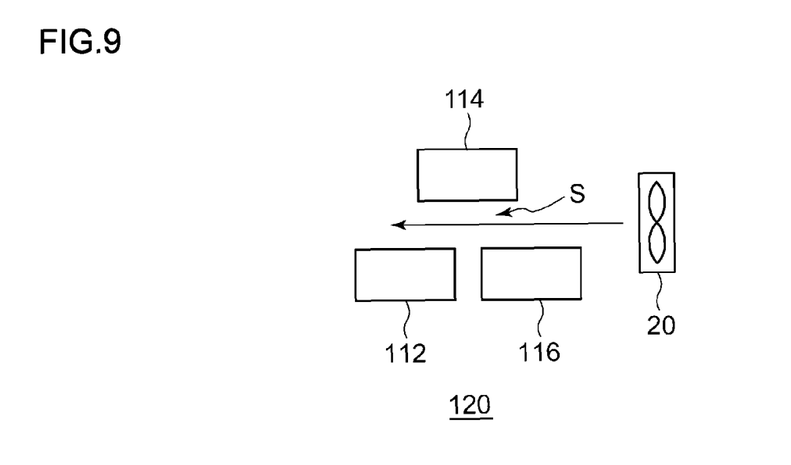
FIG. 9 is a view schematically illustrating a positional relationship between a plurality of light emitting modules and a cooling fan.
Figure 10:
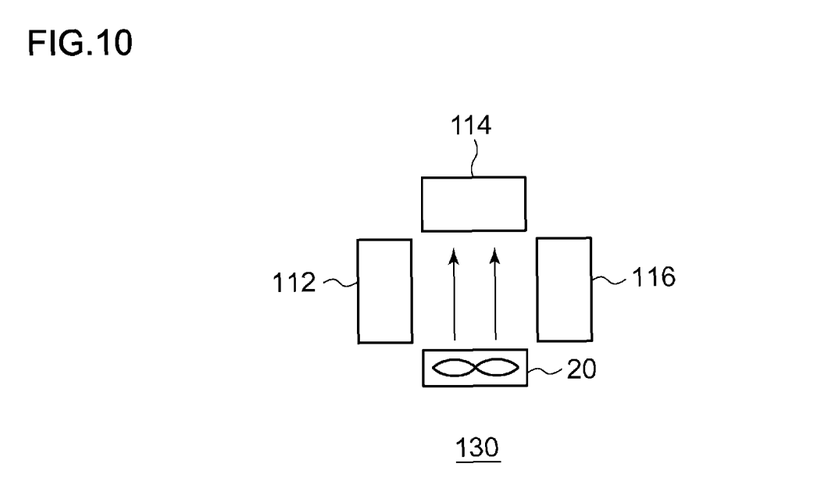
FIG. 10 is a view schematically illustrating a positional relationship between a plurality of light emitting modules and a cooling fan.

In a lamp 120 illustrated in FIG. 9, the three light emitting modules 112, 114, and 116 are arranged so as to sandwich an air trunk S. In a lamp 130 illustrated in FIG. 10, wind is blown to an area surrounded by the three light emitting modules 112, 114, and 116. Accordingly, the plurality of the light emitting modules 112, 114, and 116 can be efficiently cooled by the single cooling fan 20 in these lamps.

Figure 11:
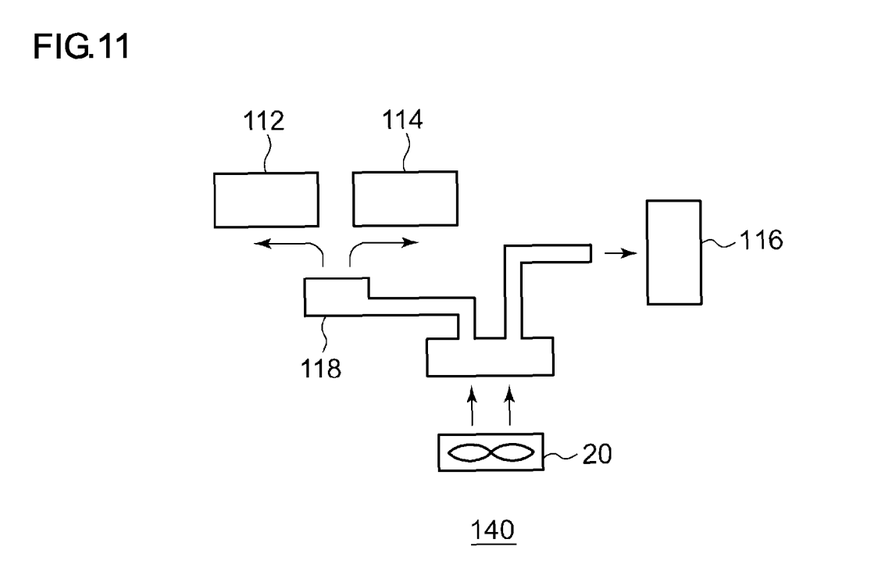
FIG. 11 is a view schematically illustrating a positional relationship between a plurality of light emitting modules and a cooling fan.

In a lamp 140 illustrated in FIG. 11, a duct 118 is provided between the cooling fan 20 and the three light emitting modules 112, 114, and 116. Accordingly, the plurality of the light emitting modules 112, 114, and 116 can be efficiently cooled by the single cooling fan 20 in the lamp 140. In addition, the flexibility in arranging the cooling fan 20 and the three light emitting modules 112, 114, and 116 is increased in the lamp 140. Accordingly, the whole of the lamp can be miniaturized.

The present invention has been described above with reference to the aforementioned respective embodiments, but the invention is not limited to the aforementioned respective embodiments, and variations in which the structures of the embodiments are appropriately combined or substituted are also encompassed by the invention. In addition, appropriate changes of the combinations or the orders of the processes in the aforementioned embodiments can be made and various modifications, such as design modifications, can be made with respect to the aforementioned embodiments, based on the knowledge of those skilled in the art. Such modified embodiments can also fall in the scope of the invention.

The present invention can be used in automotive lamps, etc.

The invention claimed is:

1. A light emitting module comprising:
a semiconductor light emitting element;
a lighting control circuit configured to control lighting of the semiconductor light emitting element;
a first heat radiating member on which the lighting control circuit is mounted;
a second heat radiating member that is separated from the first heat radiating member by virtue of being spaced apart from the first heat radiating member and has a mounting surface on which the semiconductor light emitting element is mounted; and
a connecting mechanism having both a connecting portion that connects the first heat radiating member and the second heat radiating member together and a conductive portion that transmits a signal from the lighting control circuit to the semiconductor light emitting element,
wherein the connecting portion is formed of a resin material having a coefficient of thermal conductivity lower than those of the first heat radiating member and the second heat radiating member such that the first heat radiating member is thermally separated from the second heat radiating member whereby increases in temperature of the control circuit or the semiconductor light emitting element can be suppressed.

2. The light emitting module according to claim 1,
wherein the highest temperature at which the lighting control circuit is allowed to work is set to be lower than that at which the semiconductor light emitting element is allowed to work, and
wherein the thermal resistance of the first heat radiating member is larger than that of the second heat radiating member.

3. An automotive lamp to be used in a vehicle, comprising:
the light emitting module according to claim 1; and
a reflector configured to reflect the light emitted from the light emitting module toward the vehicle front side,
wherein the light emitting module is arranged such that a light emitting surface of the semiconductor light emitting element faces the reflector.

4. The automotive lamp according to claim 3 further comprising a cooling fan,
wherein the cooling fan is arranged such that air can be blown onto both the first heat radiating member and the second heat radiating member.

* * * * *